Jan. 21, 1947.   R. L. EDGAR ET AL   2,414,726
CAR CONSTRUCTION
Filed March 9, 1944   4 Sheets—Sheet 2
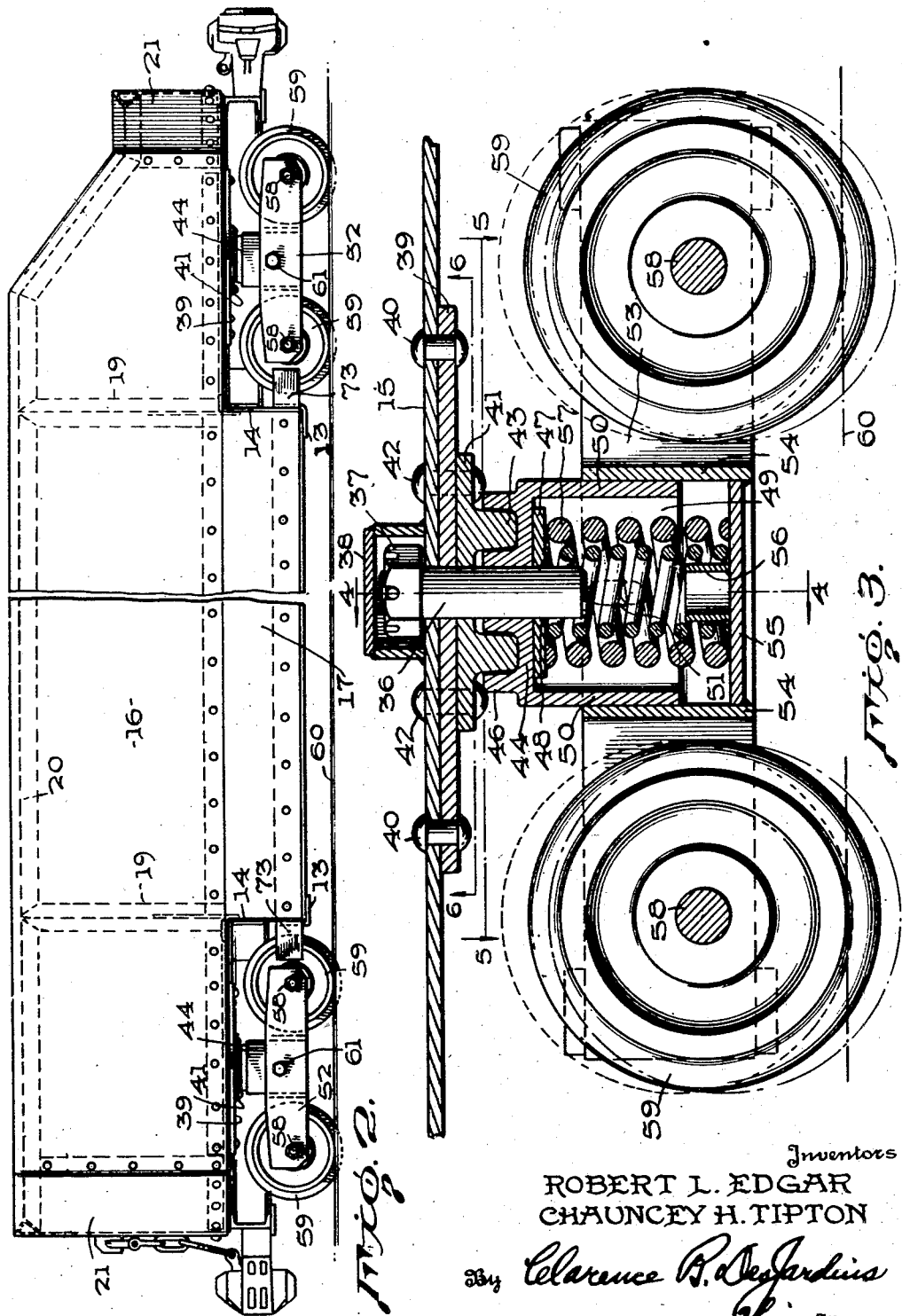
Inventors
ROBERT L. EDGAR
CHAUNCEY H. TIPTON
By Clarence B. Desjardins
Their Attorney Jan. 21, 1947.    R. L. EDGAR ET AL    2,414,726
CAR CONSTRUCTION
Filed March 9, 1944    4 Sheets-Sheet 3
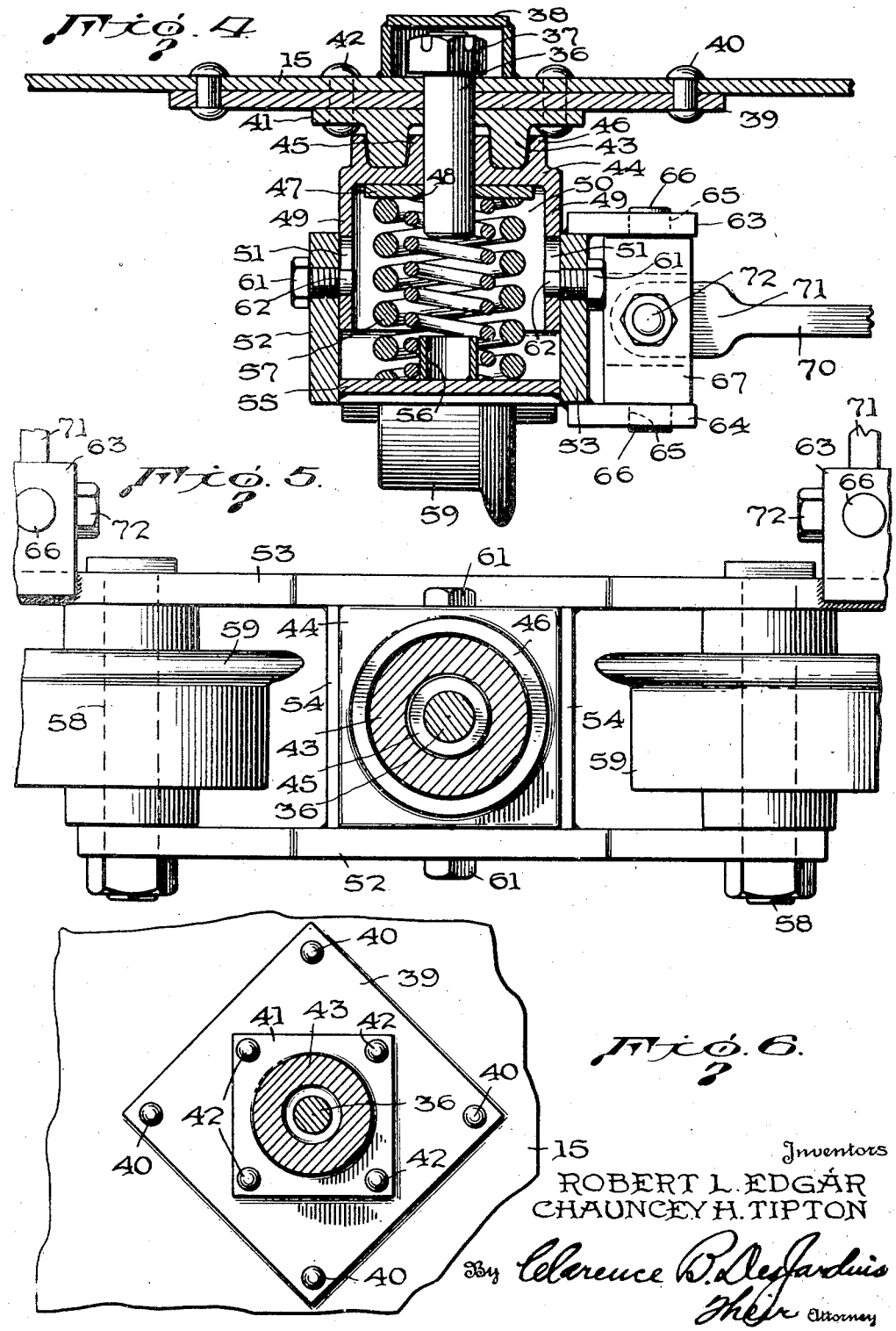
Inventors
ROBERT L. EDGAR
CHAUNCEY H. TIPTON
By Clarence B. Desjardins
Their Attorney Jan. 21, 1947.  R. L. EDGAR ET AL  2,414,726
CAR CONSTRUCTION
Filed March 9, 1944  4 Sheets-Sheet 4
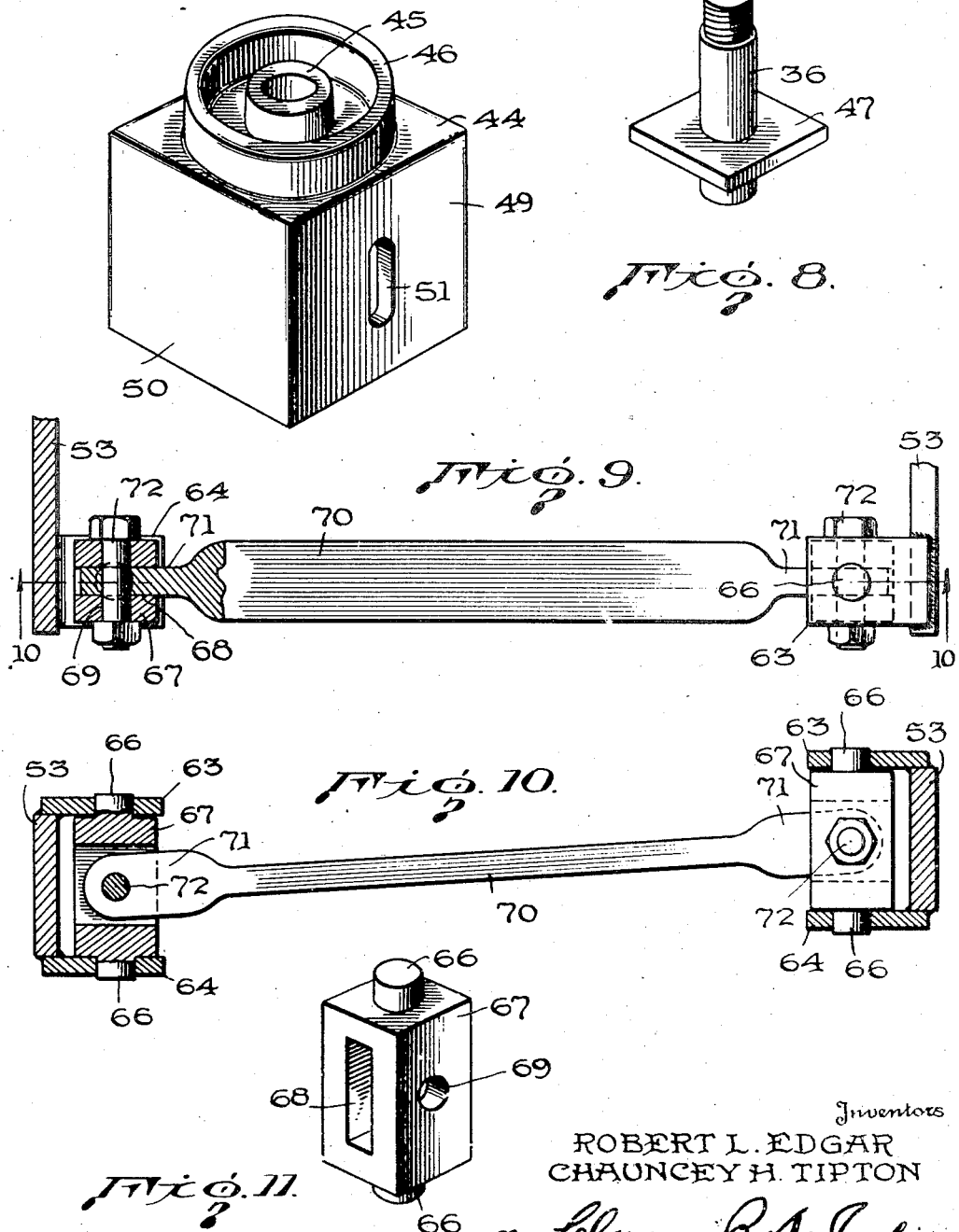
Inventors
ROBERT L. EDGAR
CHAUNCEY H. TIPTON
By Clarence B. Desjardins
Attorney Patented Jan. 21, 1947

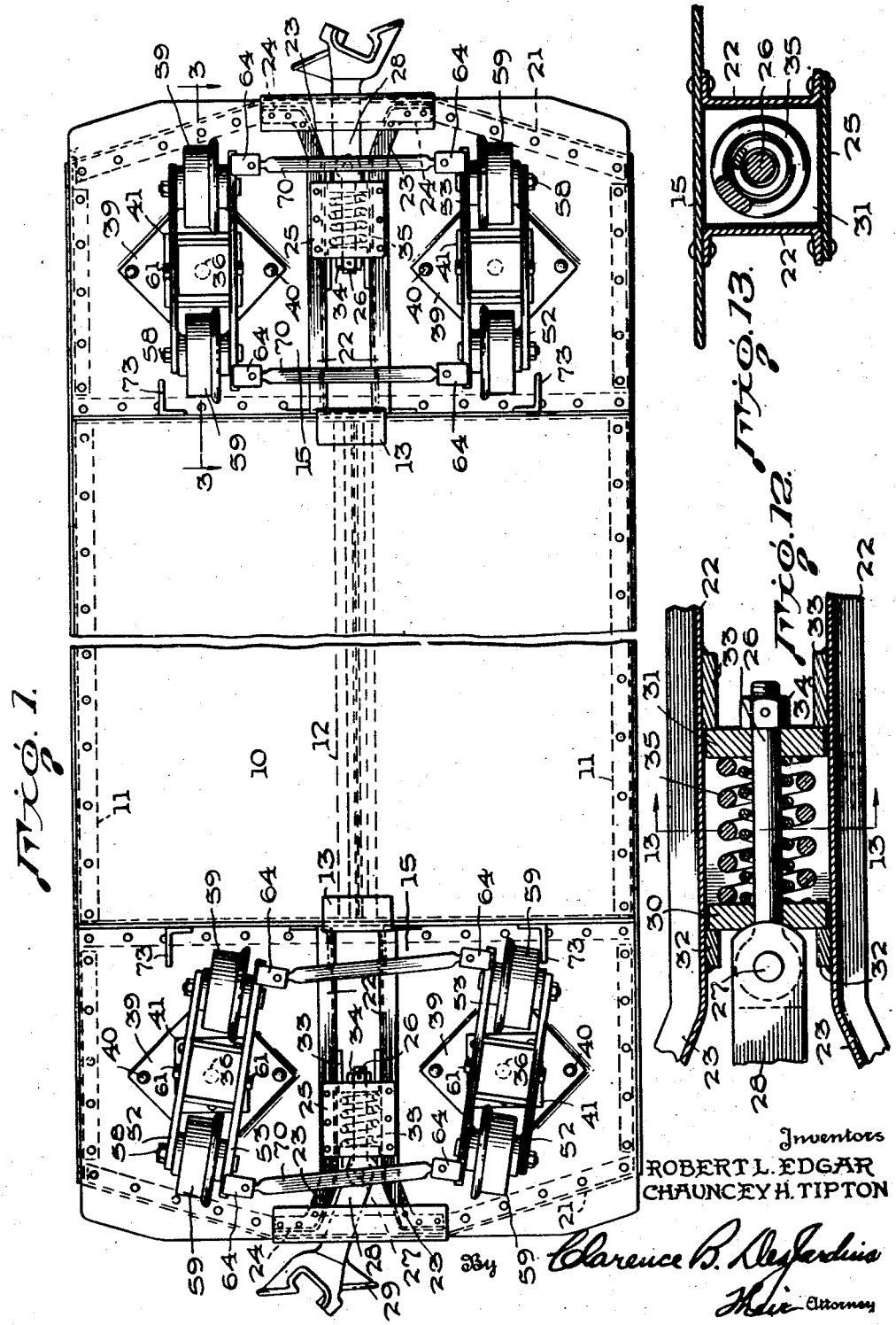

2,414,726

UNITED STATES PATENT OFFICE 2,414,726

CAR CONSTRUCTION

Robert L. Edgar and Chauncey H. Tipton, Barnesville, Ohio, assignors to The Watt Car & Wheel Company, Barnesville, Ohio, a corporation of Ohio Application March 9, 1944, Serial No. 525,680

2 Claims. (Cl. 105—179)

1

Our invention relates to improvements in car construction and has to do, more particularly, with an eight-wheel car construction that is particularly useful as a mine car.

The principal object of our invention is to provide a car construction that will permit of a large load-carrying capacity, within the dimensional limits imposed by the fact that the car is to be used in and about mines.

A further object of our invention is to provide a car construction in which the car is resiliently supported from eight wheels, and which is simple and economical to manufacture and durable and efficient in use.

Another object of our invention is to provide an eight-wheel construction, in which the wheels are mounted in pairs in swiveled truck frames, and the frames at the same end of the car are connected by means which insure the general parallelism of the frames, while permitting a slight tipping thereof in rounding curves or passing over inequalities in the track.

A further object of our invention is to provide an improved truck assembly, in which a member mounted on the car bottom to swivel about a vertical axis is slidably, non-rotatably and resiliently mounted on a truck frame, carrying wheels at opposite ends thereof.

Further objects, and objects relating to details of construction and economies of manufacture, will definitely appear from the detailed description to follow. In one instance, we have accomplished the objects of our invention by the devices and means pointed out in the following specification. Our invention is clearly defined and pointed out in the appended claims. A structure constituting a preferred embodiment of our invention is illustrated in the accompanying drawings, forming a part of this specification, in which Fig. 1 is a bottom plan view of a car construction embodying our invention.

Fig. 2 is a view thereof in side elevation.

Fig. 3 is a vertical, sectional view through one truck and its mounting, taken on the line 3—3 of Fig. 1.

Fig. 4 is a vertical, sectional view, taken on the line 4—4 of Fig. 3.

Fig. 5 is a view, partly in horizontal section and partly in top plan, taken on the line 5—5 of Fig. 3.

Fig. 6 is a horizontal, sectional view, looking toward the bottom of the car, taken on the line 6—6 of Fig. 3.

Fig. 7 is a perspective view of the lower center

2 bearing member and the spring housing forming a part thereof.

Fig. 8 is a perspective view of the king pin and the retaining plate thereon.

Fig. 9 is a top plan view of one of the tie bars and the universal connections with the trucks at the ends thereof, a portion being shown in horizontal section.

Fig. 10 is a sectional view, taken on the line 10—10 of Fig. 9.

Fig. 11 is a perspective view of the swivel block forming part of the universal connection for the tie bar.

Fig. 12 is a fragmentary, sectional view of the buffer and draft gear, and

Fig. 13 is a sectional view, taken on the line 13—13 of Fig. 12.

In the drawings, the same reference numerals refer to the same parts throughout the several views, and the sectional views are taken looking in the direction of the arrows at the ends of the section lines.

In general, our invention comprises an eight-wheel car construction, in which four truck frames are provided, two at each end of the car, and one on either side of the longitudinal centerline of the car bottom, so that the four truck frames are symmetrically located under the four corners of the car. Each truck frame has a pair of axles mounted therein, one at each end thereof, and there is a car wheel mounted on each axle. Each truck frame supports resiliently a member which is slidable vertically, but not rotatable, with respect to the truck frame, and this member is so mounted on the car bottom that it cannot move vertically with respect thereto, but can swivel about a vertical axis. To maintain the truck frames on the same end of the car in general parallelism, they are connected by one or more tie bars, the ends of which are universally connected to the truck frames, so that the latter can tip from the vertical, if necessary in rounding curves or passing over inequalities in the track. The car construction of our invention also comprises a central lading bottom and end lading bottoms in a higher plane, and the truck frames are mounted on the end lading bottoms, so that the horizontal plane of the central lading bottom is below that in which the axles lie.

Referring to the numbered parts of the drawings, the car comprises a central lading bottom 10, to the side edges of which angles 11 are secured and to the upper surface of which there is secured a stiffening member 12, that extends longitudinally of the bottom midway between the sides thereof. Angle members 13 are secured to the edges of the central bottom 10, adjacent the ends of the stiffening member 12. Riser plates 14 are secured at their lower edges to the bottom sheet 10 and the upright members of the angles 13, and the upper edges of said riser sheets are secured to the end lading bottoms 15, which lie in a horizontal plane considerably above that of the central lading bottom 10. The sides of the car are formed by the side plates 16, extending from one end of the car to the other, and the plates 17 secured to the lower central portions of plates 16 and to angles 11. The sides of the car are stiffened by the ribs 19 and the longitudinally extending belt rails 20. The ends of the car are formed by the end plates 21, formed as shown in Fig. 1.

At each end of the car, there is provided a combined buffer and draft gear. This comprises a pair of draft members 22 spaced from each other and having their upper edges secured to the end bottom plate 15, substantially in line with the end of the stiffening member 12. Plate 25 is secured to the lower flanges of channels 22, as shown in Fig. 13. The ends of the channels are flared outwardly at 23 and, then, turned laterally and secured to the end structure of the car, as indicated at 24. Stops 32 and 33 are welded to the inner faces of the channel members 22, and followers 30 and 31 are slidable on the plate 25 between the channels 22. A compression spring 35, which may be of double construction as shown, is interposed between the followers 30 and 31. A bolt 26 extends through the follower 30, the spring 35 and the follower 31, and a nut 34 screwed on the end of the bolt engages the follower 31. The other end of the bolt is pivotally connected, at 27, to the shank 28 of a draw bar and coupler head 29. When the coupler is under buffing strain, the end of the shank 28, engaging the follower 30, compresses the spring 35 against the follower 31, which is held against movement by the stops 33. When the coupler is under draft strain, the nut 34 engaging the follower 31 pulls it forward, compressing spring 35 against follower 30 which is held against movement by the stops 32. It should be noted that buffing and draft strains are transmitted by the followers 30 and 31 to the stops 32 and 33 thence to the draft members 22 and transmitted thereby to the portion of the car structure that is strengthened by member 12.

Symmetrically located underneath the four corners of the car, there are mounted four truck frames, in each of which a pair of car wheels is mounted, fore and aft of the frame. These truck frames are mounted on the elevated end lading bottoms 15, and the truck frames at one end of the car are arranged at equal distances on opposite sides of the longitudinal centerline of the car bottom. These truck frames and their mountings are all alike and are, as follows:

A king pin 36 extends vertically through a hole in the bottom 15, and depends therefrom. A nut 37, screwed on the threaded upper end of the king pin, engages the upper surface of the bottom. This nut and the upper end of the king pin are received within a housing 38 formed by welding members together and to the upper surface of the bottom 15. A plate 39 is fastened to the bottom 15 by rivets 40 and engages the lower surface thereof, said plate having a central opening through which the king pin 36 passes. An upper center bearing member 41 is secured by rivets 42, passing through the plate 39 and bottom 15, to the lower surface of said plate, and has a central opening through which the king pin passes. This upper center bearing member 41 has a depending annular flange 43, which is coaxial with the king pin. A lower center bearing member 44 is revolubly mounted on the king pin and is coaxial therewith, said member having a central annular flange 45, surrounding the opening through which the king pin passes, and an outer annular flange 46, said two flanges forming between them an annular groove which receives the annular flange 43 on the upper center bearing member 41. A plate 47 engages the lower surface of the lower center bearing member 44, and is welded to the king pin, as at 48, thus preventing vertical movement of the member 44 with respect to the king pin, while permitting the bearing member to revolve about the king pin. The lower center bearing member 44 has formed integrally therewith a pair of depending side walls 49 and a pair of depending end walls 50, which form, with the member itself, an open-bottom spring housing of rectangular cross section. Slots 51 are provided in the side walls 49 of this housing.

The truck frame comprises a pair of spaced side members, 52 and 53, extending parallel to each other. These members are connected by the cross members 54, and the bottom member 55, welded thereto and to each other, and said cross members 54 and bottom member 55 not only connect the side members to form a rigid truck frame, but also form a guide casing which has an open top and is of rectangular cross section, and in which the spring housing is slidably mounted. A spring guide 56 is welded to the bottom member 55 and extends upwardly therefrom, centrally thereof, forming a guide for the lower end of a spring 57, which may be of double construction as shown, and which is compressed between said bottom member 55 and the plate 47. The lower end of the king pin 36, projecting through the plate 47, serves as a guide for the upper end of this spring. Axles 58 are mounted, fore and aft, in the side members 52 and 53 of the truck frame, and flanged car wheels 59, adapted to run on the track indicated at 60 in Fig. 2, are journaled on said axles and located between the side members of the frame.

As shown in Fig. 1, the truck frames at the same end of the car are interconnected so that they are, in general, maintained in parallelism, although the connections are such as to permit some tipping of the truck frames from the vertical, when this is required as in rounding a curve or passing over inequalities in the track. Brackets 63 and 64 are secured to the top and bottom edges of the side member 53 of the truck frame, which is located nearest the longitudinal centerline of the car body, at each end of the truck frame side member. Each of the brackets is provided with a hole 65, in which are journaled the trunnions 66 of a swivel block 67, whereby that block may swivel about a vertical axis. Thus, one of these swivel blocks is mounted at each end of the side member 53 of the truck frame. Each of these blocks has a slot 68 formed therein and holes 69, which extend at right angles to the slot 68. As shown in Fig. 1, the corresponding ends of the truck frames located at the same end of the car are connected by tie bars 70. Each tie bar 70 has the flattened ends 71, which extend into the slots 68 of the corresponding swivel blocks 67, and are pivotally connected thereto about horizontal axes by bolts 72, which extend through the holes 69 in the blocks and through the ends of said tie bars. Thus, said tie bars are universally connected to the truck frames.

Angles 73 are welded to the riser 14 and have legs extending toward the truck frames, in position to be engaged by the car wheels and thus limit the swiveling movement of said truck frames. Studs 61, screwed into the side members 52 and 53 of the truck frame, have projecting ends 62, which engage in the slots 51 formed in the side walls of the spring housing. These studs prevent the truck frame from falling completely away from the lower center bearing in case of derailment or overturning of the car.

The flanged car wheels 59 of the truck frame rest upon the rails of the track 60, and thus support the several truck frames. Each spring housing, formed of member 44 and walls 49 and 50, is slidably mounted in the casing formed by the members 52, 53 and 54 of one of the truck frames, and is resiliently supported therein by the spring 57, so that the spring housing can move vertically with respect to the truck frame but cannot rotate with respect thereto. The spring housing forms a part of the lower center bearing member 44, and the latter, therefore, is resiliently supported from the truck frame, so as to be movable vertically with respect thereto but is not permitted to rotate. It is, however, rotatably mounted upon the upper center bearing member 41 and the king pin 36, so that it may swivel about a vertical axis. Thus the car body is resiliently supported and the wheels are so mounted that the truck frames may swivel, as the wheels pass around curves in the track. If inequalities in the track compel the truck frame to tilt about a horizontal axis, such tilting movement will necessarily be transmitted to the lower center bearing member 44 and there is sufficient play between said members and the king pins, and between said members and the upper center bearing members, to permit this tilting.

The tie bars 70 compel the truck frames on the same end of the car to preserve, in general, parallelism with respect to each other, but, due to the universal connections between the truck frames and the ends of these tie bars, the truck frames are permitted to tilt from the vertical, as may be required in rounding curves or because of inequalities in the track. As stated heretofore, the truck frames are mounted on the end lading bottom 15 and depend therefrom while the central lading bottom 10 is at a much lower elevation and, in fact, lies in a horizontal plane which is below the horizontal plane including the axles 58. The effect of this is to keep the center of gravity of the loaded car relatively low with respect to the truck frame mountings, and this arrangement also provides for a car having the maximum load-carrying capacity consistent with the dimensional limitations imposed by reason of the fact that the car is to be used in or about a mine.

We are aware that the embodiment of our invention disclosed herein is susceptible of considerable variation without departing from the spirit of the invention, and, therefore, we have claimed the invention broadly, as indicated by the appended claims.

Having thus described our invention, what we claim as new and desire to secure by Letters Patent is:

1. In a car construction, the combination of a car bottom, a king pin carried by the car bottom and depending vertically therefrom, an upper center bearing secured to said bottom coaxial with said king pin, a lower center bearing rotatably mounted on said king pin and engaging the upper bearing, said lower bearing having walls depending therefrom forming an open-bottom spring housing of rectangular cross-section, a truck frame comprising a pair of side members, axles mounted at opposite ends of said frame, wheels mounted on said axles between the side members of the frame and revoluble in a vertical plane including the axis of said king pin, vertical and horizontal cross-members interconnecting said side members and forming therewith an open-top casing in which said spring housing is slidably mounted, a spring interposed between the bottom of said casing and the top of said housing, the side walls of said housing having slots therein, and studs carried by the frame side members and engaging in said slots.

2. In a car construction, the combination with a car bottom of an upper center bearing member secured thereto; a lower center bearing member having a bearing portion in engagement with said upper member and rotatable thereon about a vertical axis, and four vertical walls extending downwardly from said bearing portion, arranged at right angles to each other and equidistantly spaced from said axis, said walls and bearing portion forming an open-bottom spring housing of square cross-section; means for limiting vertical movement of said bearing members relative to each other; a truck frame having side members in sliding engagement with two of the downwardly-extending walls of said lower center bearing member, cross members in sliding engagement with the two remaining walls of said lower center bearing member, and a horizontal member which, with said side and cross members, forms an open-top casing of square cross-section, in which said spring housing is vertically slidable; axles mounted fore and aft in said truck frame; wheels mounted on said axles between the side members of said truck frame and revoluble in a vertical plane including said axis; and a spring arranged within said housing, coaxial with said axis, with its upper end engaging said lower center bearing member and its lower end the horizontal member of said truck frame.

ROBERT L. EDGAR.
CHAUNCEY H. TIPTON.